United States Patent [19]
Gupta et al.

[11] Patent Number: 5,649,012
[45] Date of Patent: Jul. 15, 1997

[54] METHOD FOR SYNTHESIZING AN ECHO PATH IN AN ECHO CANCELLER

[75] Inventors: Prabhat K. Gupta; Sanjay Gupta, both of Germantown, Md.

[73] Assignee: Hughes Electronics, Los Angeles, Calif.

[21] Appl. No.: 529,042

[22] Filed: Sep. 15, 1995

[51] Int. Cl.$^6$ ..................................... H04B 3/23
[52] U.S. Cl. ..................... 379/410; 379/406; 379/411; 370/286; 370/291
[58] Field of Search .................... 379/410, 411, 379/3; 370/32.1, 286, 289, 290, 291, 292

[56] References Cited

U.S. PATENT DOCUMENTS

| | | | |
|---|---|---|---|
| 4,697,261 | 9/1987 | Wang et al. | 370/32.1 |
| 4,823,382 | 4/1989 | Martinez | 379/411 |
| 5,263,020 | 11/1993 | Yatsuzuka et al. | 370/32.1 |
| 5,305,307 | 4/1994 | Chu | 370/32.1 |
| 5,307,405 | 4/1994 | Sih | 379/410 |
| 5,343,522 | 8/1994 | Yatrou et al. | 379/410 |
| 5,463,618 | 10/1995 | Furukawa et al. | 370/32.1 |
| 5,548,642 | 8/1996 | Diethorn | 379/410 |

OTHER PUBLICATIONS

Cheng et al., "Analysis of an Adaptive Technique for Modeling Sparse Systems", IEEE Transactions on ASSP, vol. 37, No. 2, Feb. 1989, pp. 254–264.

Ochiai et al., "Echo Canceller with Two Echo Path Models", IEEE Transactions on Communications, vol. COM–25, No. 6, Jun. 1977, pp. 589–595.

Chang et al., "A DSP–Based Echo–Canceller with Two Adaptive Filters", IEEE Globecom 1986, vol. 3, pp. 46.8.1–46.8.5 Dec. 1986.

Madisetti et al., "Dynamically–Reduced Complexity Implementation of Echo Cancelers", ICASSP 1986, vol. 2/4, pp. 26.4.1–26.4.4 Apr. 1986.

*Primary Examiner*—Krista M. Zele
*Assistant Examiner*—Devendra T. Kumar
*Attorney, Agent, or Firm*—John T. Whelan; Wanda Denson-Low

[57] ABSTRACT

A method of synthesizing an echo path in an echo canceller is provided. The method includes the steps of obtaining near end and far end signal samples at an echo canceller, locating the echo in a background task using a whitened version of the signal, transferring the echo location information to a foreground task, and eliminating the echo in the incoming signals by filtering the signal in the location passed to the foreground task by the background task.

19 Claims, 7 Drawing Sheets

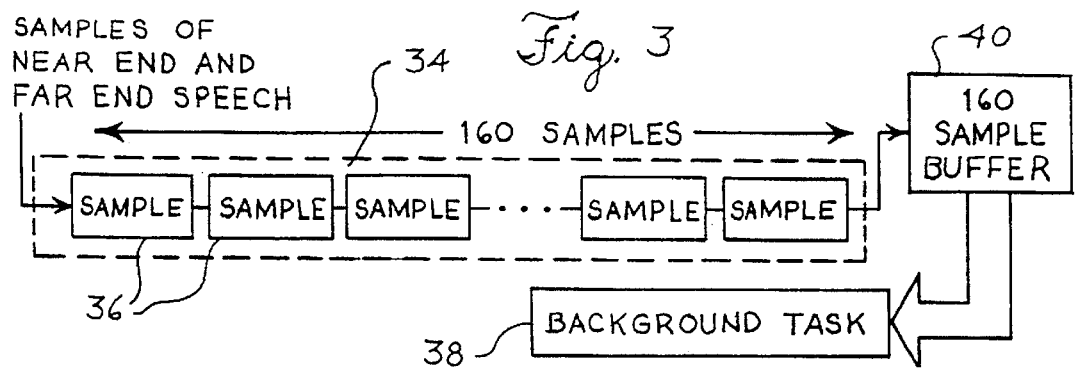
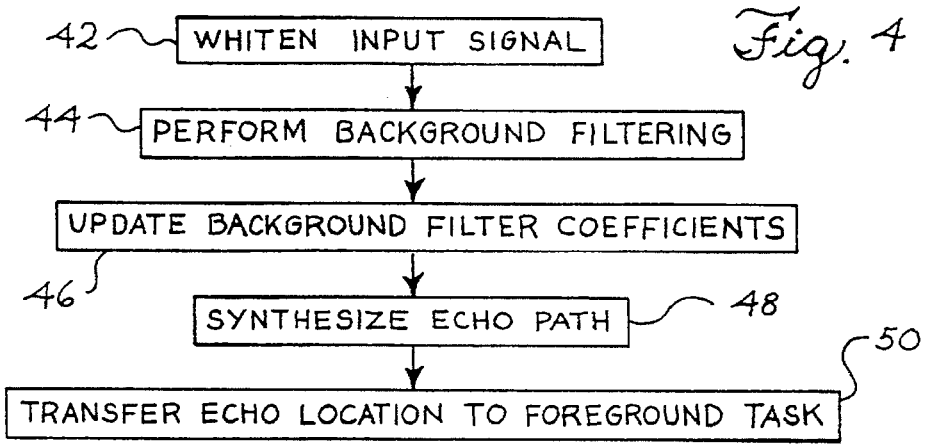
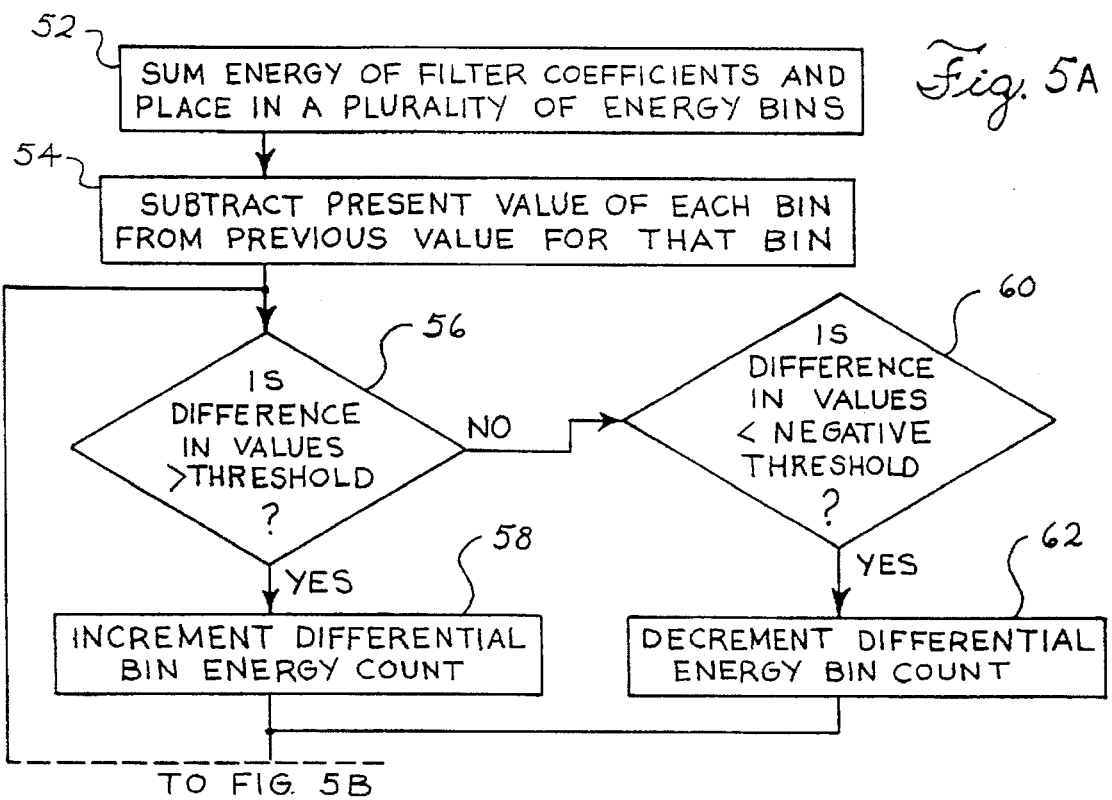

METHOD FOR SYNTHESIZING AN ECHO PATH IN AN ECHO CANCELLER

BACKGROUND OF THE INVENTION

The present invention relates to echo cancellers. More particularly, the present invention relates to a method of synthesizing the echo path of a signal in an echo canceller.

Echo cancellers are used in voice communication circuits to eliminate echoes, primarily caused by hybrid transformers which convert 2-wire circuits to 4-wire circuits. Typically, echo cancellers are based on the principle of adaptive transversal filtering. In these types of echo cancellers, the adaptive transversal filter replicates the true echo path with the opposite polarity to compensate for the imperfections of the hybrid. Generally, echo cancellers that operate on long echo tails perform poorly if all the taps of the adaptive filter are used for estimating the echo path and filtering the near end signal to generate an echo estimate.

Echo cancellers often use two adaptive transversal filters, one in the foreground and another in the background, to model the echo path. The general approach is to transfer coefficients from the background filter to the foreground filter to filter the near end signal once the echo canceller has reached some convergence state. This technique is prone to errors because double talk or a low echo return loss can result in the wrong set of coefficients being chosen for transfer to the foreground filter. To avoid these difficulties, some echo cancellers update the foreground filter only when they are sure that a double talk condition does not exist. This can result in increasing the convergence time for the echo canceller thereby degrading echo canceller performance.

Accordingly, a method of synthesizing an echo path is needed that will allow an echo canceller to quickly converge on, and accurately track, echo paths of various lengths and originating from various types of hybrids.

SUMMARY OF THE INVENTION

The present invention provides a method for synthesizing an echo path in an echo canceller. The method includes the steps of obtaining far end and near end signal samples at the echo canceller and performing a background task on the signals to locate an echo and determine the length of the echo. After finding the echo location and length, this information is transferred to a foreground task that will filter out the echo from the incoming signals. Preferably, the background task locates the echo by whitening the signals and comparing absolute and differential energy measurements to synthesize the echo.

According to one aspect of the present invention, the echo location information is only transferred to the foreground task if there has been a change detected in that location. Unchanged portions of the echo locations are not affected and portions of the foreground filter identified in the background task as not containing an echo are not processed by the foreground filter. The foreground filter continuously tracks the echo path and eliminates echoes more quickly by minimizing unnecessary calculations outside the discrete location of the echo identified in the background.

BRIEF DESCRIPTION OF THE DRAWINGS

FIG. 3 is a flow diagram, illustrating a preferred embodiment of the method of the present invention.

FIG. 4 is a flow diagram of a preferred background task for use in the method of the present invention.

FIGS. 5A and 5B show a more detailed flow diagram of the step of synthesizing the echo path showing a Differential Energy Peak Picker process used in the presently preferred method.

DETAILED DESCRIPTION OF THE DRAWINGS

This invention describes a method by which the locations of the peaks in the echo path can be reliably and quickly estimated using a background adaptive filter. These locations, rather than filter coefficients, are transferred to the foreground adaptive filter. The foreground filter, using only those coefficients defined as relevant to the echo path by the background task, synthesizes the echo path.

Figure 1:
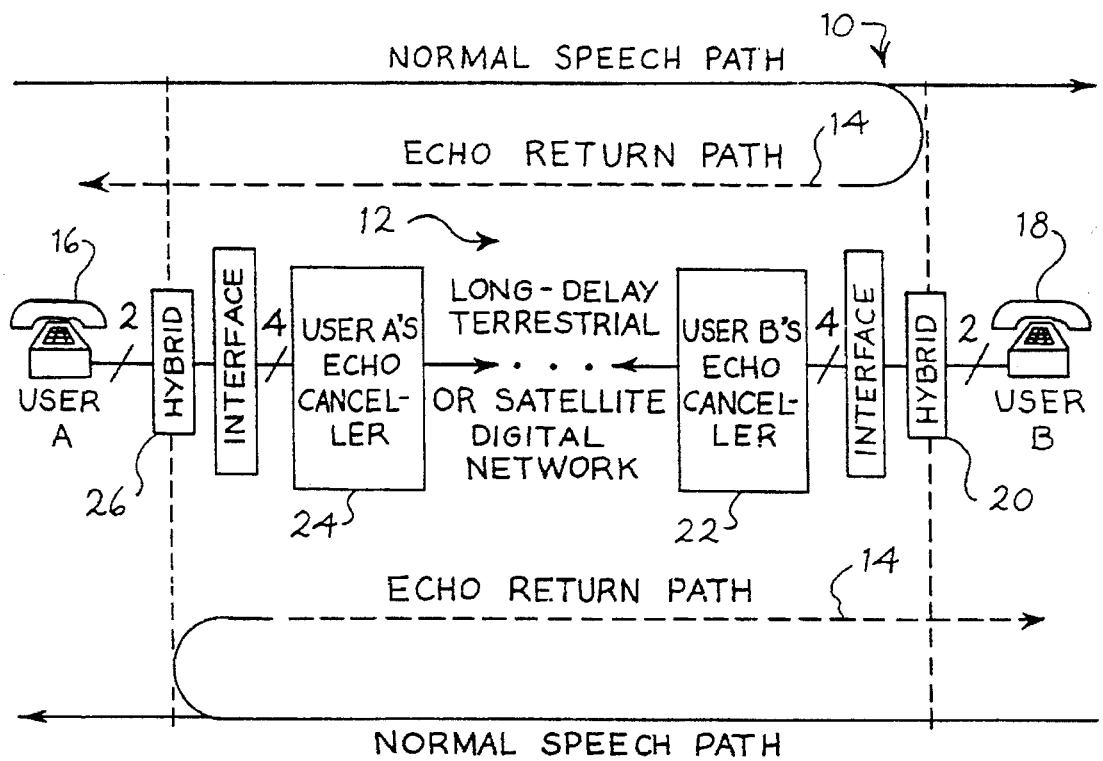
FIG. 1 is a block diagram illustrating a generic bidirectional transmission path in a communications system.

An echo canceller acts to filter or cancel out reflected signals that are generated in telephone communications. As background for the environment the presently preferred method may operate on, FIG. 1 illustrates a generic bidirectional transmission path. In a typical telephone conversation between two users communicating over a telephone network, echoes 14 made up of reflected energy may develop. If user A 16 speaks, part of the signal passes through the network 12 to user B 18 and part of the signal will often reflect back from the 4 wire to 2 wire hybrid 20 near user B. User B's echo canceller 22, operating properly, will filter out and suppress speech reflected back to user A from the hybrid 20. User A's echo canceller 24 operates 5 to filter and suppress user B's speech reflected off of the hybrid 26 near user A. The method of the present invention may operate within the echo cancellers 22, 24 shown in FIG. 1.

Figure 2:
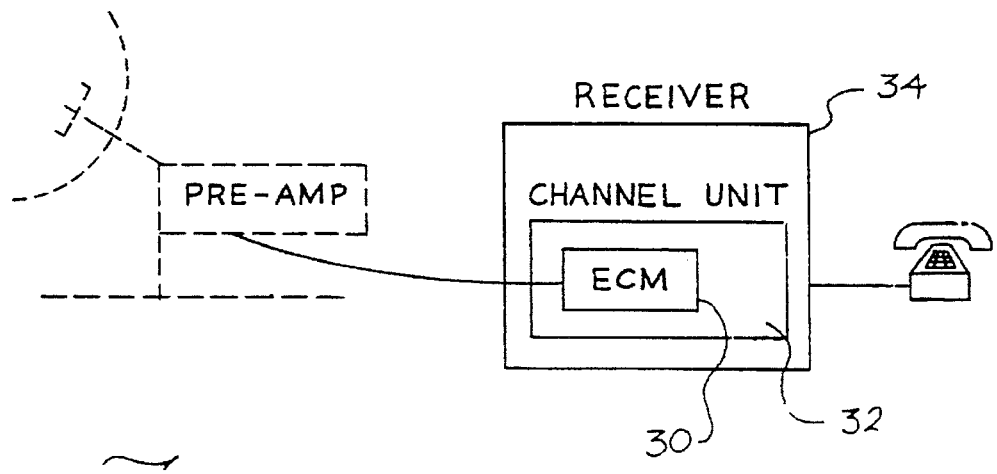
FIG. 2 is a block diagram of a satellite telephony ground station receiver that may be used with the method of the present invention.

A preferred embodiment of the present invention operates on an echo canceller module (ECM), which is a part of a channel unit in a satellite telephony ground station. Referring to FIG. 2, a satellite telephony ground station receiver 34 is shown having a channel unit 32 and an echo canceller module 30 inside the channel unit. The present method may be performed on a digital signal processor (DSP) in the echo canceller module 30. A Texas Instruments TMS C31 is one type of DSP which may be used. Because the voice quality of a satellite telephony network may be improved significantly, the network may replace terrestrial networks in many applications. The presently preferred embodiment may also be incorporated in any wireless communication system or land line network.

According to one embodiment, a Least Mean Square (LMS) routine is implemented on a voice signal in an adaptive transversal filter. Preferably, a 384 tap filter is used to handle up to 48 msec of round trip delay in the echo path. Using all 384 taps to cancel the echo will generally not provide good echo cancellation because the filter has a tendency to become unstable as a result of its feedback mechanism. Most echo paths consist of reflections created by one or two hybrids with a dispersion of 3 to 6 msec. This type of echo only requires adjustments to a few taps of the filter. The other taps of the filter, though not necessary to address the echo, each have very small values that may combine to introduce significant noise in the echo cancelled signal.

According to a preferred embodiment, the implementation of two substantially independent tasks provides a solution to this problem. The purpose of one task is solely to identify the echo location, henceforth referred to as the background task. The other task obtains the echo locations from the background task and updates and cancels the echo using the taps in the location provided by the background task. The unused filter taps,those outside the location designated by the background task, are set to zero. This process is henceforth referred to as the foreground task.

As shown in FIG. 3, a signal is first operated on in the foreground task. The foreground task 34 works on 0.125 millisecond samples 36 of signal received at the echo canceller containing far end and near end signals. Near end refers to signals originating from the end of the communications link closest to the echo canceller of interest. Far end refers to signals originating from the end of the communications link away from the echo canceller of interest. After each sample 36 is worked on in the foreground 34, the background task 38 exhausts any remaining time to work on the samples it has been passed by the foreground task. After 160 samples, which corresponds to 20 milliseconds, the samples that have been accumulating in a buffer 40 after being worked on in the foreground, are all moved to the background 38. Every 20 milliseconds the background receives the samples 36 previously processed in the foreground.

The background task is executed in the time left after the foreground process and the echo control module finish processing the input samples/commands. Unlike the foreground task, the background task works on an entire frame of 20 milliseconds of data, and hence has 20 milliseconds of shared digital signal processor time with the foreground task with which to finish its operation. During the shared time, the background task uses several processes to identify echo locations. These locations are provided to the foreground task. This helps in minimizing the work of the foreground process and improves the overall echo canceller performance.

Due to the quasi-periodic nature of speech, multiple impulses may show up on the filter taps of an echo canceller causing echo canceller performance to suffer and even causing the echo canceller to become unstable. The problem is more apparent in echo cancellers handling more than 16 milliseconds of echo tail delay. Referring to FIG. 4, the first step in the background task is to whiten 42 the incoming signal to remove the periodicity. The whitened signal is used as the input to the background filtering and update process to estimate the echo path.

The whitened signal is used in the background filtering process 44. The whitening filter removes only the correlated part in the speech signal. All 384 taps of the background adaptive transversal LMS filter are used in the filtration process. The error function, which is the difference of the echo canceller estimate of the echo and the actual echo, is computed on each sample of the filtering process. This error function is used by the background filter update process 46 to update its coefficients if the background process is in the update mode.

The background filter coefficient update process 46 receives the error signal from the filtering process 44. Certain conditions must be met before the coefficients can update. These conditions are necessary so as to prevent the background filter from updating when there is near end speech or when certain background operations, such as transferring echo location from background to foreground, requiring substantial amount of real time need to be executed.

The next step in the preferred method is synthesizing 48 the echo path by locating the starting point of the echo in the signal and determining the size of the echo. It is of paramount importance in this echo canceller design to identify the correct location of the echo in the echo path. The foreground filtering process, that will be described below, does the actual echo cancellation and is totally dependent on the background process to correctly identify the echo locations. The time the echo canceller takes to locate the echo also plays a very important role. The longer it takes to identify the echo location, the longer the user of the system will hear echoes. To alleviate this problem, the step of synthesizing the echo path preferably combines two processes. One process was selected by the virtue of its speed and other for accuracy. The two processes are a Differential Energy Peak Picker (DEPP) and an Absolute Energy Peak Picker (AEPP).

The DEPP is used to get a coarse estimate of the new, changed or eliminated echo location. This process is executed at the end of each 20 millisecond frame in which the background filter coefficients were updated for all 160 samples. The DEPP is a relatively fast operation and can identify change in echo location status within 200 milliseconds. The DEPP causes the background filter taps to be reset to zero when any echo location is eliminated. When the DEPP adds any echo locations to the foreground process it can also remove any locations it had added earlier, if the absolute energy window buffer contains a zero for that bin location indicating that the AEPP process has not yet identified that point as a valid echo location.

The AEPP is used as the fine tuner for the DEPP process. It is a much slower process and may take 1.6–2.0/seconds of background filter coefficient updates to identify the new echo locations. Similarly, the AEPP takes longer to lose the locations which are no more valid. The echo location stored in the AEPP window buffer and DEPP window buffer are logically "or' ed". If a new echo location is identified or a location has been eliminated, the new window containing location and length information is transferred to the foreground task.

Figure 5B:
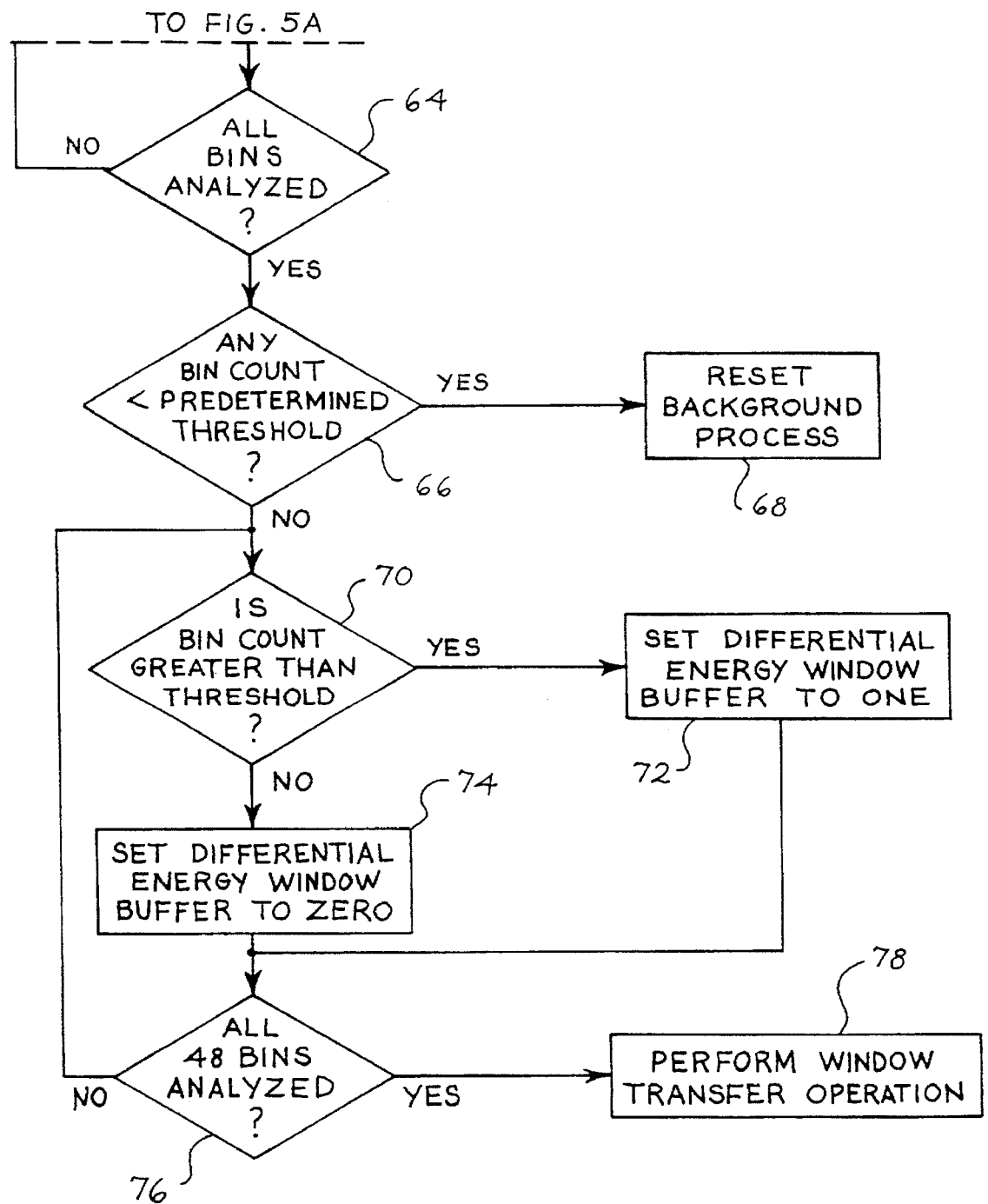

Referring to FIG. 5A and 5B, a more detailed description of the process used by the DEPP in the synthesis step 48 of the presently preferred method is shown. The energy of the 384 filter coefficients is first summed 52 and placed in energy bins. Eight filter coefficients, or taps, are added together and placed in a bin such that 48 bins (384 taps/8) are created. The arithmetic difference 54 of the current energy bin values and the corresponding energy bin values computed the previous time is calculated. If the difference 56 for a given bin exceeds a given positive threshold, then the differential energy bin count associated with that bin is incremented 58. If the difference 60 is less than a given negative threshold, then the differential energy bin count associated with that bin is decremented 62. The above operation is performed for each bin 64.

After all differential energy bin counts are computed, a thresholding is done on the counts. If any bin count is below a minimum threshold 66, the background filter coefficients are set to zero 68 because the echo path, if there was an echo, has changed. If the background is not reset, then for any bin with bin count greater than 70 a given threshold, a one is loaded 72 in the differential energy window buffer corresponding to that bin, else, a zero is loaded 74. This process is repeated until all 48 bins have been compared 76 to the threshold value, which is preferably −20. Any differential energy bin having a value of 1, indicates that an echo is present in that location. The differential energy window is then transferred to a window transfer operation 78.

Figure 6A:
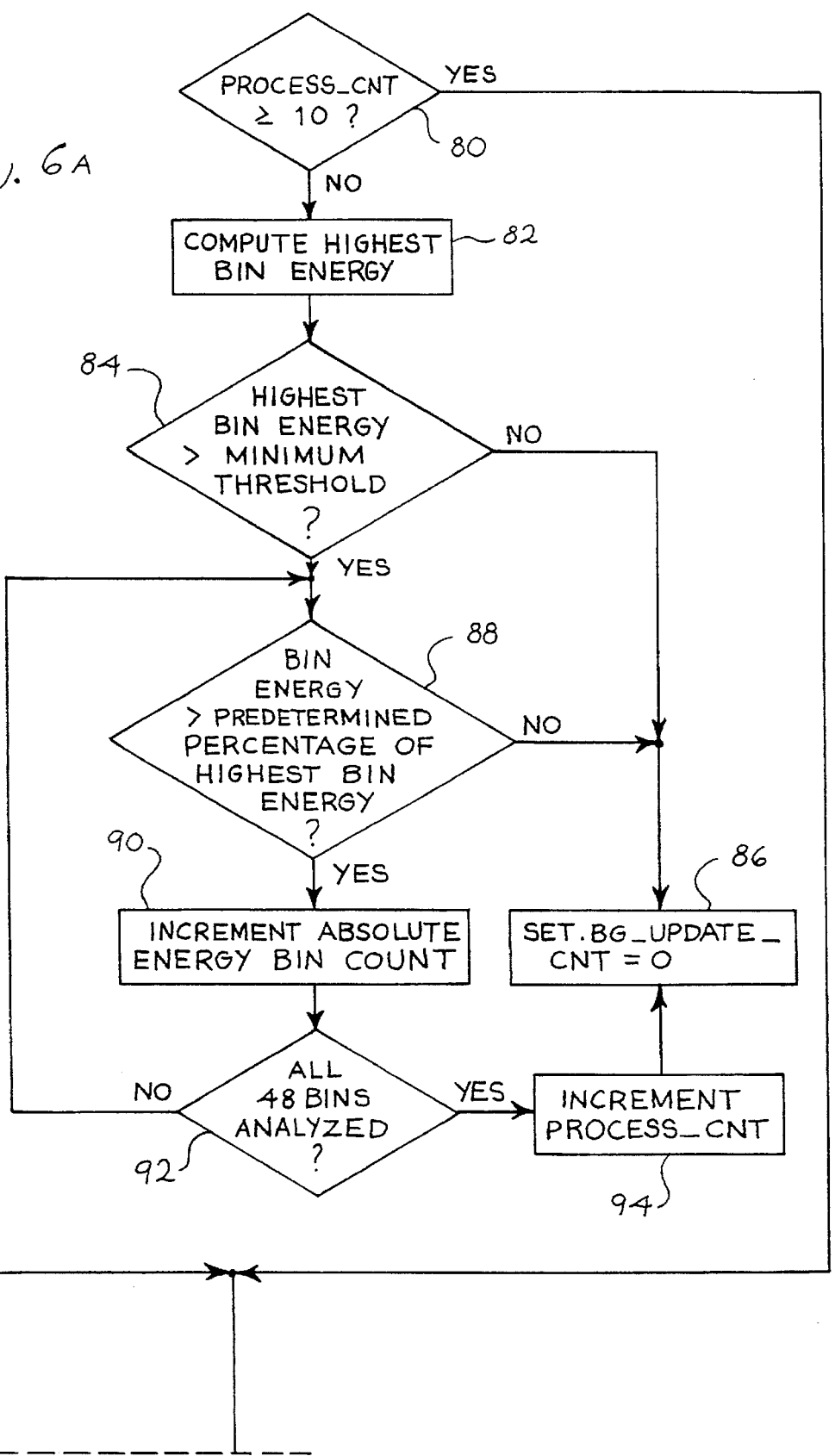
FIGS. 6A and 6B show a more detailed flow diagram of the step of synthesizing the echo path showing Absolute Energy Peak Picker used in the presently preferred method.
Figure 6B:
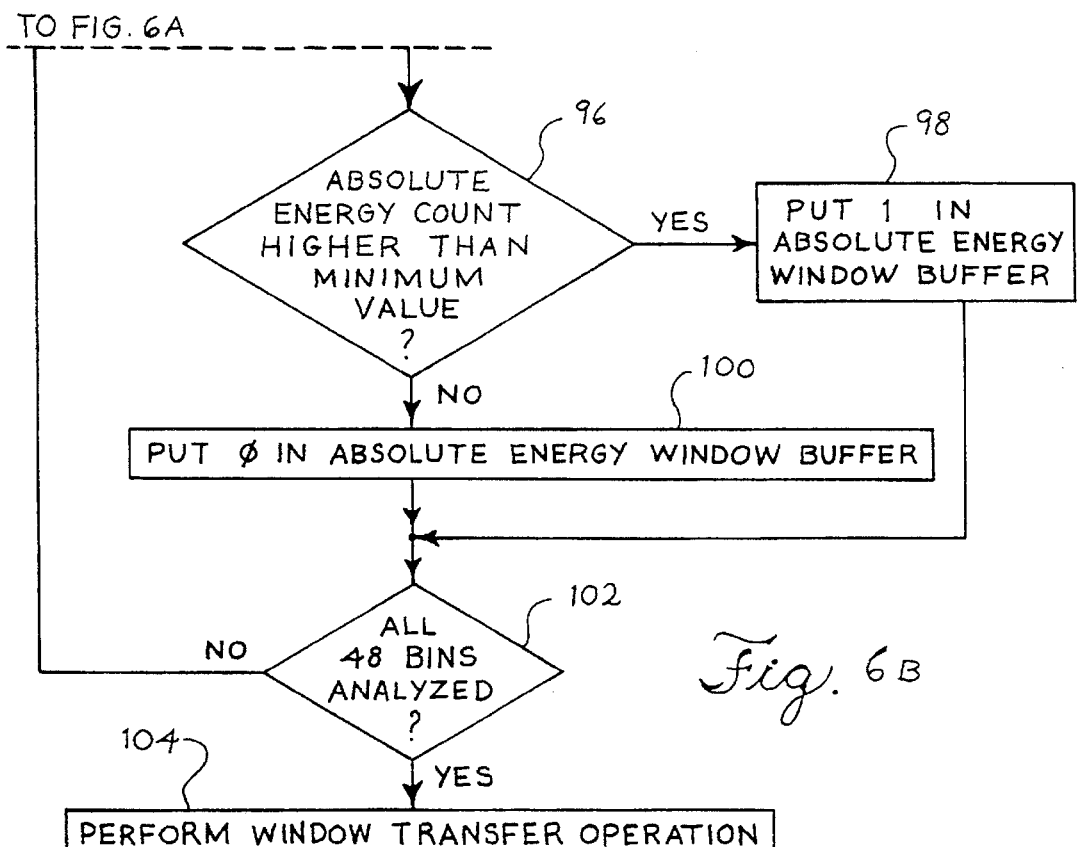

In contrast to the relatively fast operation of the DEPP, the AEPP performs a more thorough identification process. The AEPP only operates if BG_update_frame, a counter that keeps track of how many times all 160 samples have been updated, is greater than or equal to 6. BG_update_frame is incremented by one every time BG_update_cnt, which tracks the number of individual samples updated, reaches 160. As shown in FIGS. 6A and 6B, the AEPP process looks first 80 to see if the AEPP process has been executed ten times. If not, the AEPP process determines 82 the highest bin energy for all of the bins. Specifically, for every 8 frames having coefficients updated for each of the 160 samples, the energy for the background filter is computed in sets of 1 millisecond (8 taps) to 48 energy bins. The highest bin energy is computed 82. If the highest energy bin is above a minimum threshold 84, all 48 bins are examined. The BG_update_cnt is reset to zero 86 at the beginning of each frame (160 samples).

Assuming the highest bin energy is above the minimum threshold, each bin energy is assessed. All bins with energy values more than a predetermined percentage of the highest bin energy 88 and higher than a minimum energy increment 90 their respective absolute energy bin counts. Once all 48 bins have been assessed 92, the process_cnt counter is incremented 94. After 10 such runs, process_cnt will have the value of 10 and the absolute energy bin counts higher than a minimum value 96 put a one 98 in the absolute energy window buffer, else a zero is loaded 100. After this, the absolute energy bin counts are zeroed.

Figure 7:
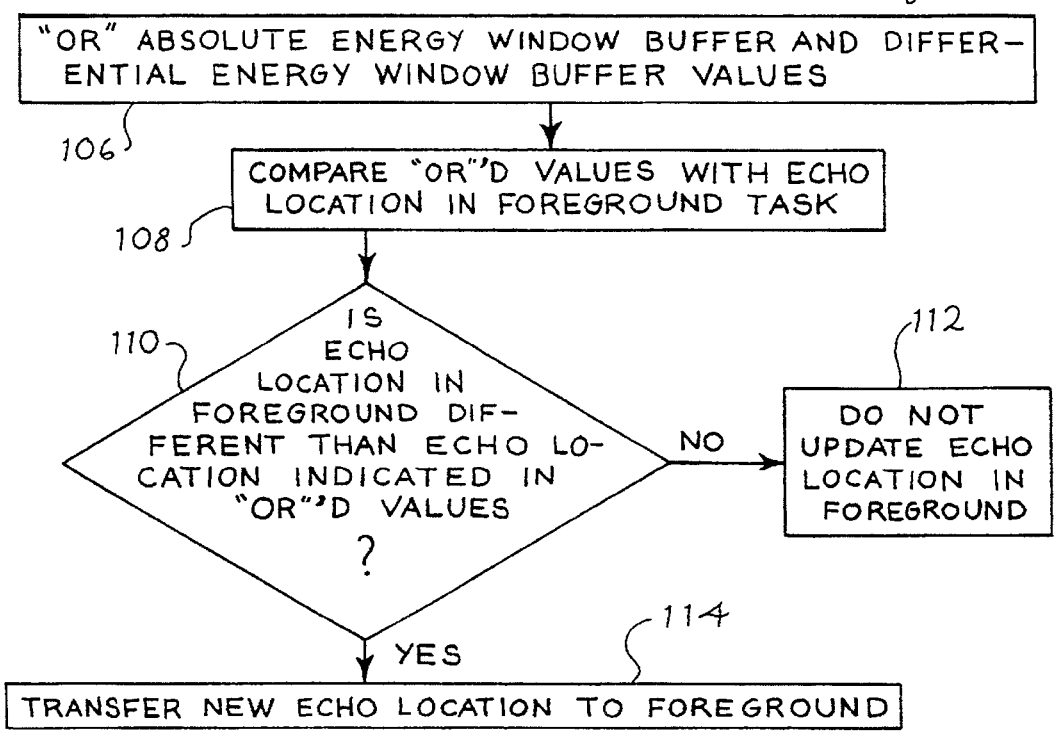
FIG. 7 is a flow diagram showing a preferred window transfer operation for use in the presently preferred method.

As shown in FIG. 7, following either the differential energy window buffer update or the absolute energy window buffer update, a window transfer step is performed. The two energy window buffers are processed 106 through a logical "OR" function. If there are any echo locations present 108, 110 in the resultant "OR'd" information that are not present in the foreground window buffer, then the 'or' of the differential energy window buffer and absolute energy window buffer is placed in the foreground window buffer 114. This value "synthesizes" the echo path by providing location and length information. No transfer is made 112 if the echo information in the foreground task is the same as the information derived in the background task.

When a transfer from the background to the foreground does take place, the foreground filter coefficients at the locations where an echo is still found are preferably not affected. According to a preferred embodiment, every time a window is transferred, the locations where no echo has been identified by the background task are zeroed. Thus, after some locations are added/deleted, any locations in the foreground filter still covered by the 2–4 wire hybrid transfer function (i.e., echo location) determined by the background are untouched. Because only the new echo locations in the signal having echoes will start from zero state, convergence time of the foreground filtering process is minimized.

The foreground task, has two main processes: foreground filtering and foreground filter coefficient updating. The foreground filtering process cancels the echo in the near end signal and the foreground filter coefficient update process tries to minimize the difference between true and estimated echo.

The foreground filtering process uses the taps of the foreground adaptive transversal filter to compute what it thinks is the echo component in the near end signal. It then subtracts this value from the near end signal to generate the residual signal which can be either low level residual echo or the near end signal plus the residual echo. Because the taps of the 384 tap adaptive transversal filter outside locations specified by the background task are zero, the filtering process uses only the non-zero taps while computing the echo signal. As with the transfer of the echo location to the foreground, this is done to save time. This process is executed for every input sample.

Once the foreground filtering is complete, the echo canceller updates the foreground filter coefficients. Foreground filter coefficient update is done based on the LMS algorithm. The error signal generated by the filtering process is first restricted within the bounds of the far end signal power (y_power). Then, the echo canceller computes the product of the normalized error function, the foreground coefficient update constant (FG_beta) and inverse y_power squared. As described above, the background process identified the echo locations in the echo path and transferred them to the foreground process. The foreground update routine takes these locations and updates the coefficients in these locations. The remaining coefficients are zeroes. Due to real time constraints, only half the filter coefficients are updated in the foreground filter each sample using the standard LMS algorithm.

Figure 8:
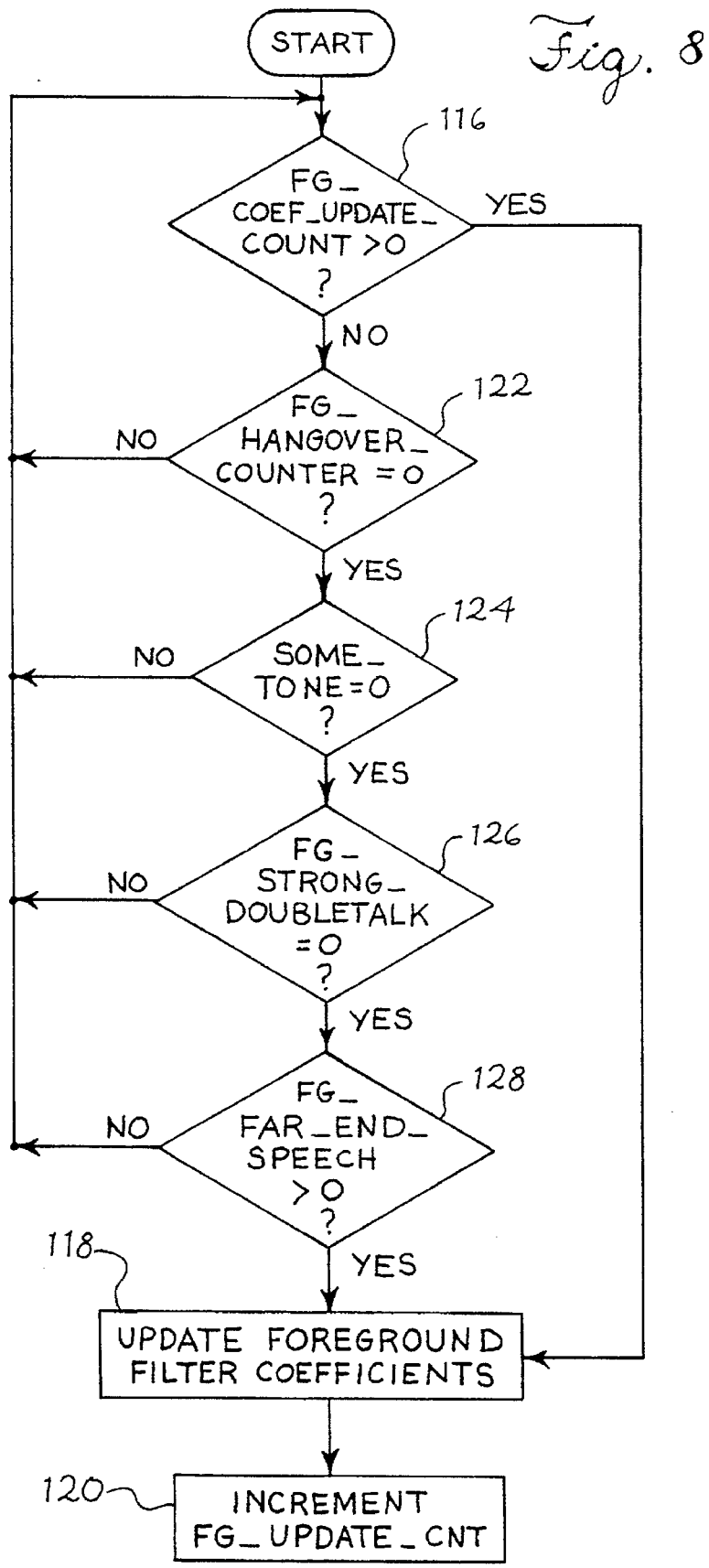
FIG. 8 is a flow diagram illustrating a preferred process of controlling foreground filter updates according to the presently preferred method.

The quality of the error signal is important to the update process. The error function to be used in the update process is only useful if it does not contain any near end speech. If there is near end speech in the error signal and the echo canceller tries to minimize the error, the error signal will diverge as no correlation exists between the far end and the near end speech. Because no minimum error function exists, it is essential not to update the filter coefficients in the presence of near end speech. Also, the presence of tones, which are periodic signals, has a detrimental effect on updating the coefficients and finding the location of the echo. The echo canceller may converge in presence of tones, but due to the incorrect location identification of the echo path, it might diverge when speech is input into the system. The steps taken before updating the taps are shown in FIG. 8.

A first step is checking 116 if the foreground coefficient update count (FG_coef_update_count) is greater than zero. If the first step 116 is true then the canceller is updated 118 and FG_update_cnt is incremented 120. Alternatively, if FG_coef_update_count is not greater than zero, then if 122 FG_hangover_counter and both some tone and foreground strong doubletalk (FG_strong_doubletalk) variables are zero 124, 126 and if there is foreground far end speech present 128 (FG_far_end_speech) then the filter coefficients are updated 118 and the foreground update counter (FG_update_cnt) is incremented 120. Some_tone is the output of a tone detector in the echo canceller. Any tone detectors commonly known to those of ordinary skill in the art may be used to supply a tone flag indicative of the presence of a tone. The variable FG_strong_doubletalk represents the output of a double talk detector. Any double talk detector commonly implemented in echo cancellers may be used. The variable FG_hangover_counter represents a counter for controlling a waiting period after near end speech ends. FG_update_count keeps track of how many times the coefficients have been updated. Each time the coefficients are updated, all of them are forced to be updated the same number of times. The update process cannot stop after updating half of the coefficients even though near end speech is suspected, a tone has been detected, there is strong double talk or the far end speech is gone. FG_coef_update_cnt is set to zero when all the coefficients have been updated. FG_update_cnt is a variable which is set to zero at the beginning of each 20 millisecond frame and increments by one for each update. If all 160 samples in the frame are updated, FG_update_frame is incremented by one for each frame to a maximum of 3, else it is set to zero. FG_update_frame is used by the background process to determine when it should update its filter coefficients.

Figure 9:
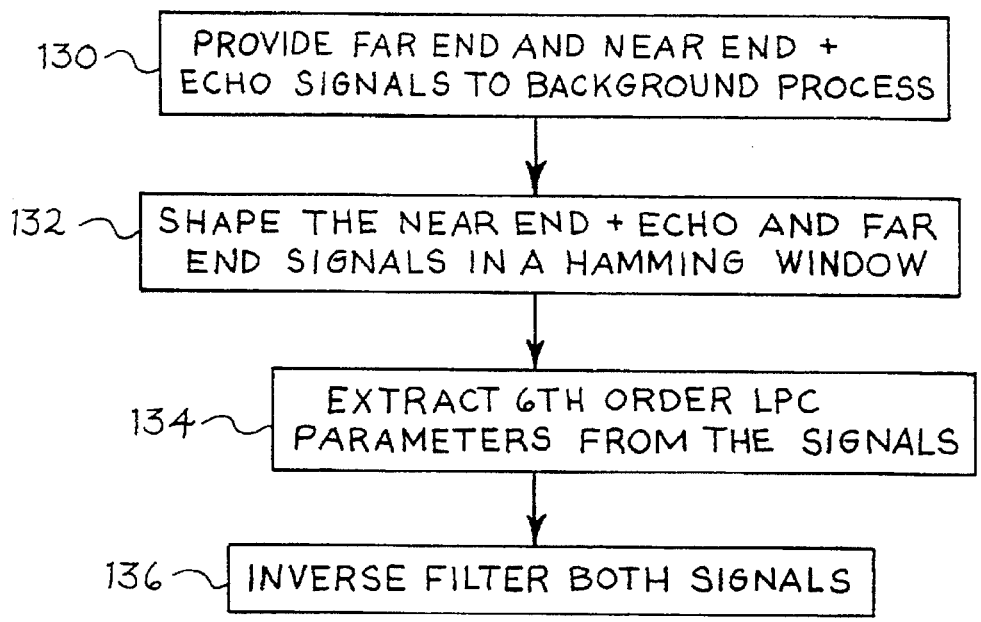
FIG. 9 is a detailed flow diagram of the step of whitening a signal as shown in the method of FIG. 4.

Referring to FIG. 9, a more detailed illustration of a preferred method of whitening 42 (FIG. 4) a signal is shown. Two speech signals, the near end speech plus echo and the far end speech, are provided 130 to the background task. The background task shapes 132 the near end plus echo and far end signals using a Hamming Window. After the windowing process, the 6th order LPC parameters of the two signals are extracted 134. Using these parameters, both the signals are inverse filtered 136 in a FIR filter to remove all spectral content. What is left is a whitened signal.

Figure 10:
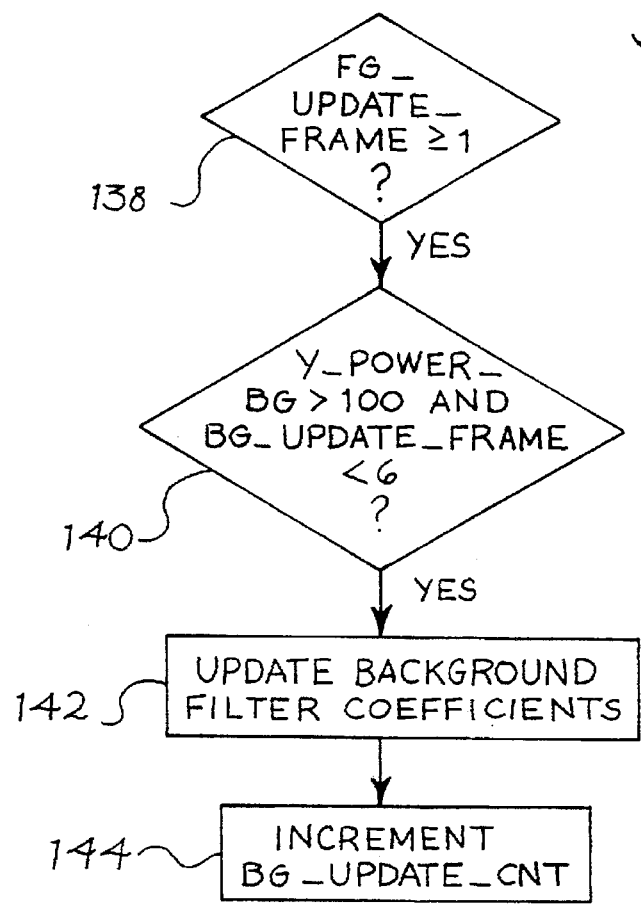
FIG. 10 is a flow diagram illustrating the decision process in the background filter update step of FIG. 4.

As described above, the step of updating 46 the coefficients in the background filter only occurs if certain conditions are true. FIG. 10 illustrates the steps the echo canceller takes in evaluating whether to update the coefficients. First, the foreground update variable (FG_update_frame) is referenced 138 to determine its value. FG_update_frame is greater than or equal to one if the 20 millisecond frame just transferred to the background task caused the foreground coefficient update process to update its coefficients for each of the 160 samples. This guarantees that there is no near end speech in the input signal. When BG_update_frame is 6 or greater 140, the echo path synthesis operation is to be performed and hence there is not enough real time to update the coefficients. During the update process, y_power_BG is compared 140 to a minimum threshold, preferably 100, to ensure that the whitened signal is not too low in amplitude. Each time the coefficients are updated 142, BG_update_cnt is incremented 144. It can take a maximum value of 160 (equal to the number of the samples in the buffer). All 384 coefficients are updated according to the LMS algorithm. 48 coefficients are updated for each filtered error signal and it takes 8 error signals to update all 384 coefficient. If the background filter is coming out of reset because of echo canceller divergence, the background coefficient update constant BG_beta is very high. After the absolute energy peak picker has identified the peaks, the rate drops. The rates are different to help speed up the background convergence process after reset.

As described above, a method having a background process to identify the locations in the echo path that contain the echo energy is provided. These locations, rather than coefficients, are then transferred to the foreground process which filters the signal and generates the echo estimate. The background process uses a differential energy peak picker and an absolute energy peak picker to find the peaks in the echo tail reliably and quickly. By implementing one preferred method of the present invention, the echo canceller is able to converge well on different kinds of echo paths with single or multiple hybrids. As a result the performance of the echo canceller is superior to other known techniques.

It is intended that the foregoing detailed description be regarded as illustrative rather than limiting, and that it be understood that the following claims, including all equivalents, are intended to define the scope of this invention.

What is claimed is:

1. A method for synthesizing an echo path in an echo canceller comprising the steps of:

obtaining far end and near end signal samples at the echo canceller from a far end signal and a near end signal;

performing a background task on said far end and near end signal samples to locate an echo and determine a length of the echo;

transferring the echo length and location to a foreground task; and performing said foreground task on said far end and near end signal samples to eliminate the echo from the near end signal samples whereby the echo location and length determined in the background task are used to guide the foreground task in filtering out the echo in the near end signal; and wherein the step of performing the background task includes the step of processing a set of filter tap values associated with the background task using first and second different processing methods to locate the echo and determine the length of the echo.

2. The method of claim 1 wherein the step of performing a foreground task further comprises filtering the near end signal samples in a foreground filter and updating filter coefficients in said filter.

3. The method of claim 1 wherein the step of transferring echo length and location further comprises verifying that at least one of the echo length and location has changed and transferring the echo length and location to the foreground task only if at least one of the echo length and location has changed whereby convergence time of the echo canceller may be decreased by eliminating unnecessary data transfer.

4. The method of claim 1 wherein the step of performing said foreground task further comprises:

updating added and deleted echo locations in a foreground filter; and leaving unchanged echo location information undisturbed whereby echo canceller convergence time is reduced.

5. The method of claim 1, wherein the step of processing includes the step of logically "OR"ing a result of the first processing method with a result of the second processing method to determine the location and the length for the echo.

6. The method of claim 1 wherein the step of performing a background task further comprises whitening the far end and near end signal samples, filtering the whitened signal samples in a filter having a plurality of coefficients, updating the filter coefficients and synthesizing an echo path from the whitened signal samples.

7. The method of claim 6 wherein the step of updating the filter coefficients comprises verifying that no near end speech is in the near end signal samples before updating the filter coefficients, and updating a plurality of coefficients based on received error signals.

8. The method of claim 6 wherein the whitened signal samples are filtered in an adaptive transversal filter using a least mean square routine.

9. The method of claim 8 wherein the filter comprises a 384 tap filter capable of handling a 48 millisecond delay.

10. The method of claim 1, wherein the first processing method includes the step of processing the set of filter tap values to determine a set of differential energy values associated with a plurality of filter tap locations and wherein the second processing method includes the step of processing the set of filter tap values to determine a set of absolute energy values associated with the plurality of filter tap locations.

11. The method of claim 10, wherein the first processing method comprises a differential energy peak picker and wherein the second processing method comprises an absolute energy peak picker.

12. A method for synthesizing an echo path in an echo canceller comprising the steps of:

obtaining far end and near end signal samples at the echo canceller from a far end signal and a near end signal;

performing a background task on said far end and near end signal samples including the step of processing a set of filter tap values to determine a set of differential energy values associated with a plurality of filter tap locations to locate an echo and determine a length of the echo;

transferring the echo length and location to a foreground task; and performing said foreground task on said far end and near end signal samples to eliminate the echo from the near end signal samples whereby the echo location and length determined in the background task are used to guide the foreground task in filtering out the echo in the near end signal samples.

13. A method for synthesizing an echo path in an echo canceller comprising the steps of:

obtaining far end and near end signal samples at the echo canceller from a far end signal and a near end signal;

performing a background task on said far end and near end signal samples to identify a set of filter locations associated with an echo, including the steps of;

determining an energy value for each of the set of filter locations, comparing the energy value for a number of the set of filter locations with a predetermined minimum threshold and with a threshold based on the maximum energy value for the set of filter locations, and identifying each filter location as associated with the echo if the energy value of a filter location is above the predetermined minimum threshold and above the threshold based on the maximum energy value for the set of filter locations, transferring an indication of the identified set of filter locations to a foreground task; and performing said foreground task on said far end and near end signal samples to eliminate the echo from the near end signal samples whereby the foreground task uses a filter having active filter taps associated with each of the identified set of filter locations to filter out the echo in the near end signal samples.

14. The method of claim 13, wherein each of the filter locations includes a plurality of filter taps.

15. The method of claim 13, wherein the step of determining an energy value for each of the set of filter locations includes the step of determining a differential energy value associated with each of the set of filter locations.

16. The method of claim 13, wherein the step of determining an energy value includes the steps of performing first and second independent energy calculations for each of the filter locations and wherein the step of comparing includes the step of comparing a result of the first energy calculation with a first threshold criteria for each of the filter locations to determine a first subset of filter locations associated with the echo and comparing a result of the second energy calculation with a second threshold criteria for each of the filter locations to determine a second subset of filter locations associated with the echo.

17. The method of claim 16, including the step of logically "OR"ing the first and second subsets of filter locations to determine the set of filter locations associated with the echo.

18. The method of claim 16, wherein the first energy calculation includes the step of determining a differential energy value associated with each of the filter locations and wherein the second energy calculation includes the step of determining an absolute energy value associated with each of the filter locations.

19. The method of claim 18, wherein the first energy calculation comprises a differential energy peak picker calculation and wherein the second energy calculation comprises an absolute energy peak picker calculation.

* * * * *